US012614789B2

(12) United States Patent
Yu

(10) Patent No.: US 12,614,789 B2
(45) Date of Patent: Apr. 28, 2026

(54) LITHIUM SECONDARY BATTERY CASE FOR SUPPRESSING DEFORMATION OF ELECTRODE ASSEMBLY

(71) Applicant: LG ENERGY SOLUTION, LTD., Seoul (KR)

(72) Inventor: Sung Hoon Yu, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 1008 days.

(21) Appl. No.: 17/417,710

(22) PCT Filed: Oct. 19, 2020

(86) PCT No.: PCT/KR2020/014247
§ 371 (c)(1),
(2) Date: Jun. 23, 2021

(87) PCT Pub. No.: WO2021/080269
PCT Pub. Date: Apr. 29, 2021

(65) Prior Publication Data
US 2022/0077525 A1 Mar. 10, 2022

(30) Foreign Application Priority Data
Oct. 23, 2019 (KR) ........................ 10-2019-0132219

(51) Int. Cl.
*H01M 50/121* (2021.01)
*H01M 10/0525* (2010.01)
(Continued)

(52) U.S. Cl.
CPC ..... *H01M 50/121* (2021.01); *H01M 10/0525* (2013.01); *H01M 10/058* (2013.01);
(Continued)

(58) Field of Classification Search
CPC .......... H01M 50/121; H01M 10/0525; H01M 10/058; H01M 50/105; H01M 50/119;
(Continued)

(56) References Cited

U.S. PATENT DOCUMENTS 5,004,655 A * 4/1991 Symanski ........... H01M 50/342
429/185
2015/0171461 A1* 6/2015 Akutsu ............... H01M 10/058
29/623.2
(Continued)

FOREIGN PATENT DOCUMENTS

CN 107438909 A 12/2017
CN 109690820 A 4/2019
(Continued)

OTHER PUBLICATIONS

Extended European Search Report European Application No. 20879626.8, dated Feb. 15, 2022.
(Continued)

*Primary Examiner* — Lisa S Park
(74) *Attorney, Agent, or Firm* — Birch, Stewart, Kolasch & Birch, LLP

(57) ABSTRACT
A lithium secondary battery case composed of laminate sheet including an outer layer/barrier layer/inner layer structure is provided. The case includes a first region in which gas discharge is easier or expansion is relatively easier compared to a second region. The second region is a remaining region that excludes the first region. The laminate sheet forms the first region by either not including the barrier layer or including a barrier layer having a slit therein.

13 Claims, 12 Drawing Sheets

(51) Int. Cl.
H01M 10/058 (2010.01)
H01M 50/105 (2021.01)
H01M 50/119 (2021.01)
H01M 50/126 (2021.01)

(52) U.S. Cl.
CPC ....... H01M 50/105 (2021.01); H01M 50/119 (2021.01); H01M 50/126 (2021.01)

(58) Field of Classification Search
CPC ............. H01M 50/126; H01M 10/049; H01M 50/394; H01M 50/1245; H01M 10/052; H01M 50/129; H01M 50/30; H01M 2220/30; B32B 3/266; B32B 15/085; B32B 2250/40; B32B 2270/00; B32B 2307/712; B32B 2307/724; B32B 2553/00; B32B 27/281; B32B 27/32; B32B 2250/03; B32B 15/082; B32B 2307/518; B32B 2307/7246; B32B 15/08; B32B 15/088; B32B 15/09; B32B 15/20; B32B 27/08; B32B 27/302; B32B 27/304; B32B 27/36; B32B 2307/54; B32B 2307/732; B32B 2457/10; B32B 27/308; B32B 27/325; B32B 27/34; B32B 7/12; Y02E 60/10; Y02P 70/50
See application file for complete search history.

(56) References Cited

U.S. PATENT DOCUMENTS

| | | | | |
|---|---|---|---|---|
| 2015/0367601 | A1 | 12/2015 | Ando et al. | |
| 2018/0233768 | A1* | 8/2018 | Herrmann | H01M 50/627 |
| 2019/0270185 | A1 | 9/2019 | Takada et al. | |
| 2020/0295315 | A1 | 9/2020 | Kim et al. | |

FOREIGN PATENT DOCUMENTS

| | | | |
|---|---|---|---|
| CN | 110226254 | A | 9/2019 |
| JP | 11-102673 | A | 4/1999 |
| JP | 11-162436 | A | 6/1999 |
| JP | 2007-173212 | A | 7/2007 |
| JP | 2013-120730 | A | 6/2013 |
| JP | 2014-22224 | A | 2/2014 |
| JP | 2014199827 | * | 10/2014 |
| JP | 2015-88324 | A | 5/2015 |
| JP | 2015-115161 | A | 6/2015 |
| JP | 2017-220285 | A | 12/2017 |
| JP | 6242199 | B2 | 12/2017 |
| JP | 2018-6468 | A | 1/2018 |
| JP | 2019-145267 | A | 8/2019 |
| JP | 2010-86753 | A | 2/2026 |
| KR | 10-2006-0103696 | A | 10/2006 |
| KR | 10-2014-0017908 | A | 2/2014 |
| KR | 10-2016-0084133 | A | 7/2016 |
| KR | 20170058047 | * | 5/2017 |
| KR | 10-2018-0072934 | A | 7/2018 |
| KR | 10-2018-0080921 | A | 7/2018 |
| KR | 10-2018-0093792 | A | 8/2018 |
| KR | 10-1898085 | B1 | 10/2018 |
| KR | 10-2019-0055594 | A | 5/2019 |
| WO | WO 2014/123183 | A1 | 8/2014 |
| WO | WO 2019/098545 | A1 | 5/2019 |

OTHER PUBLICATIONS

Extended European Search Report for European Application No. 22186176.8, dated Oct. 31, 2022.
Japanese Notice of Reasons for Refusal for Japanese Application No. 2021-535958, dated Jul. 26, 2022, with an English translation.
International Search Report for PCT/KR2020/014247 (PCT/ISA/210) mailed on Feb. 10, 2021.

* cited by examiner

【FIG. 1】
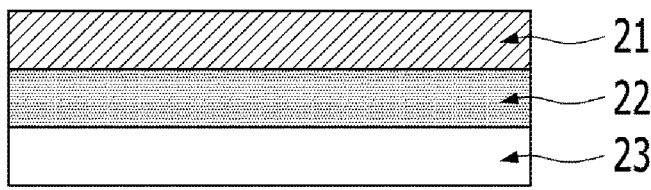
20
21
22
23

【FIG. 2】
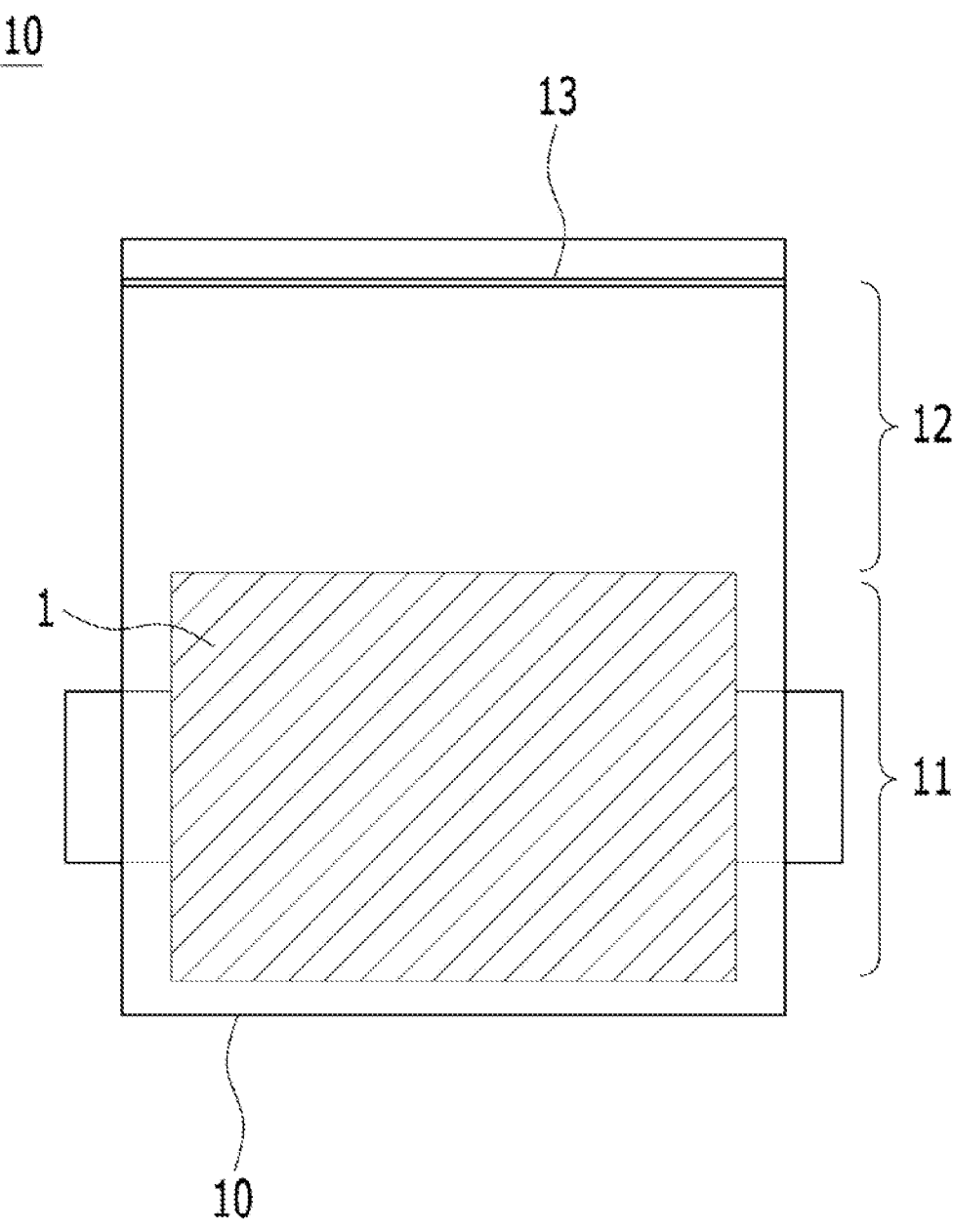

【FIG. 3】
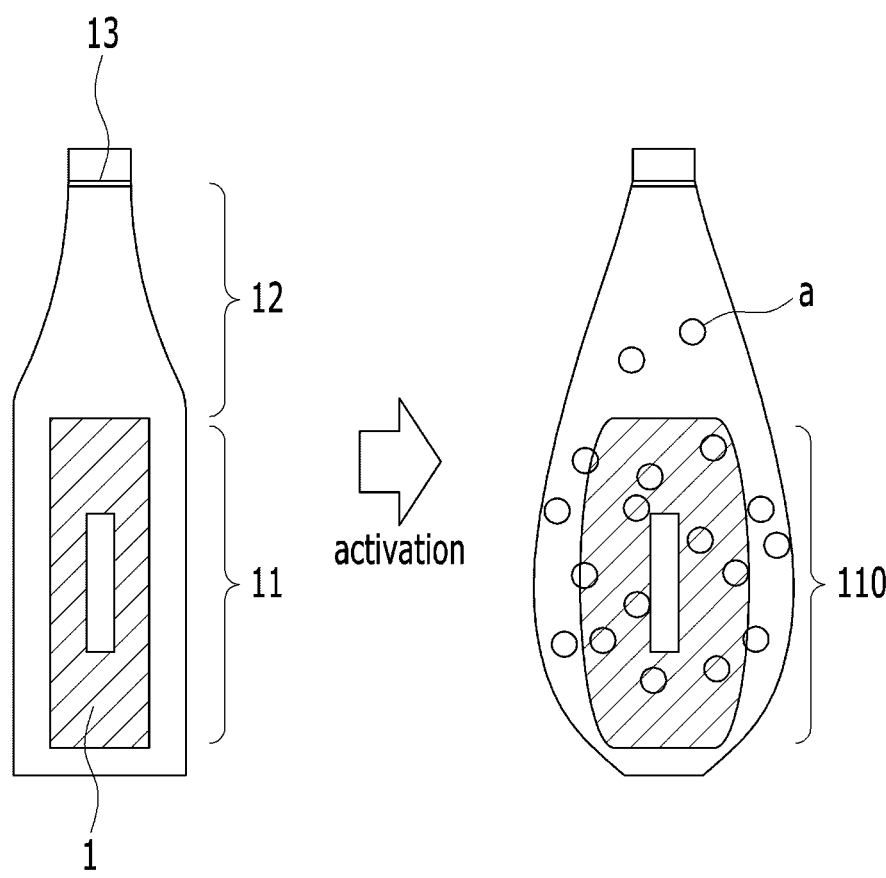

【FIG. 4】
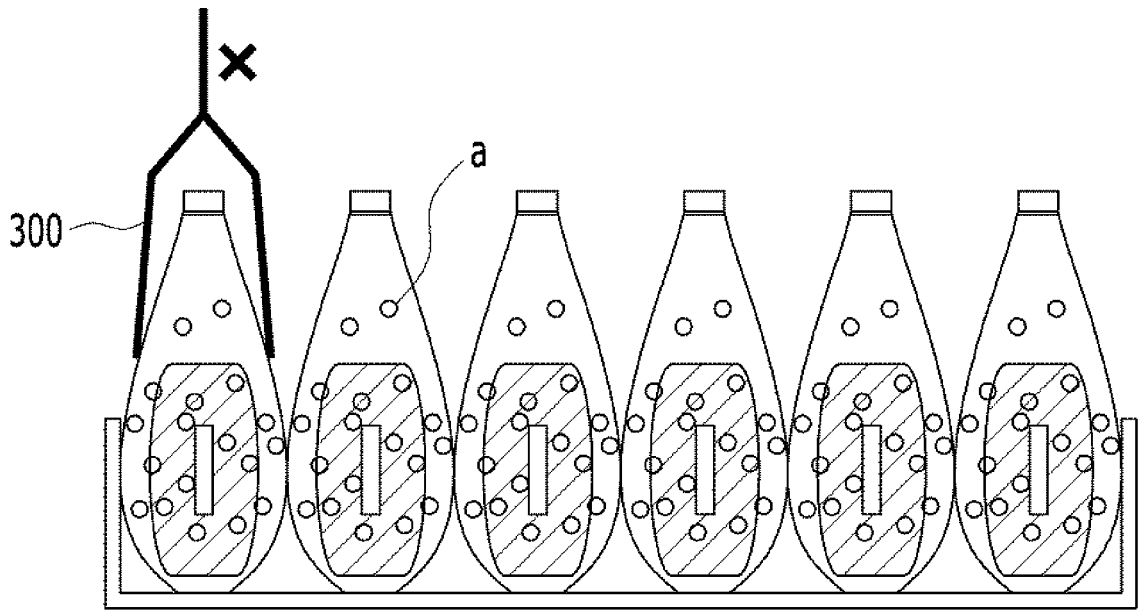

【FIG. 5】
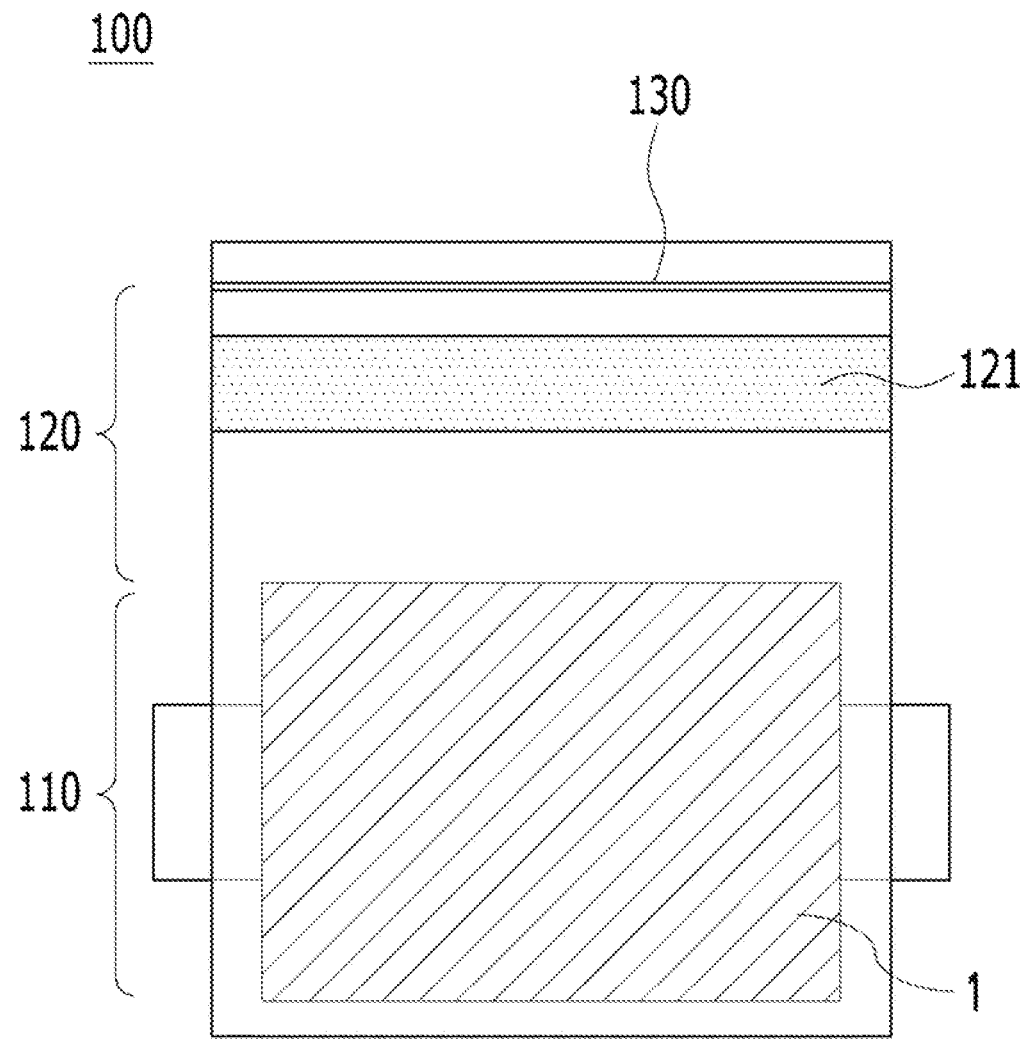

【FIG. 6】
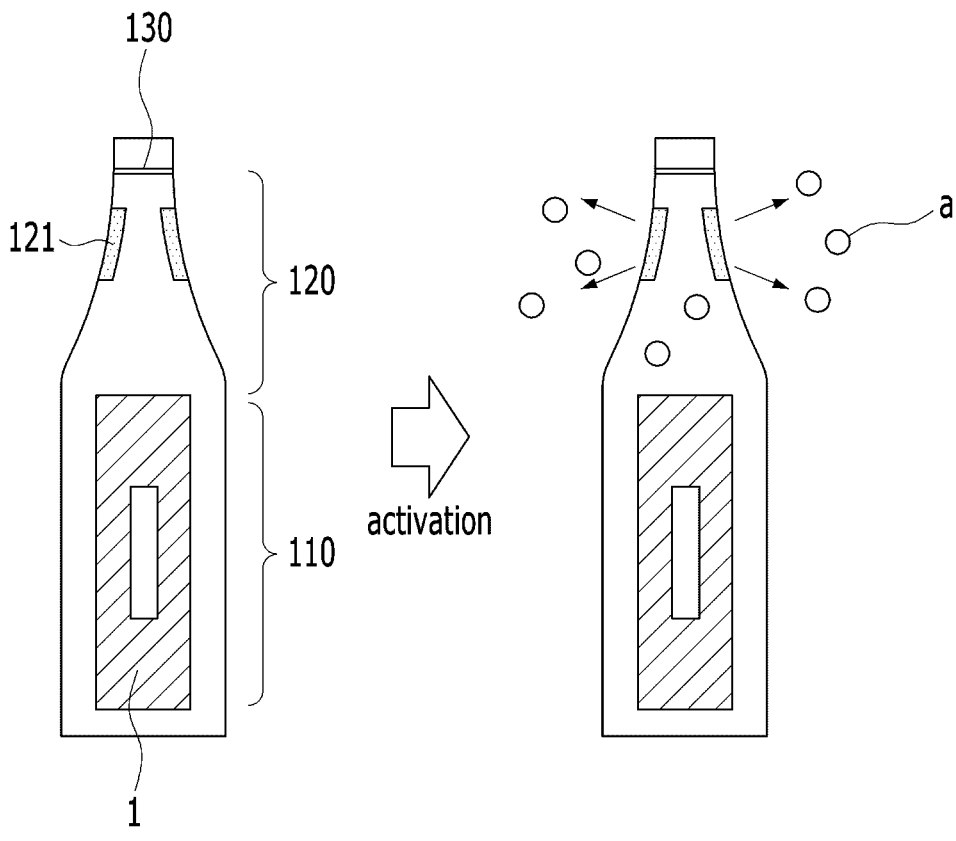

【FIG. 7】
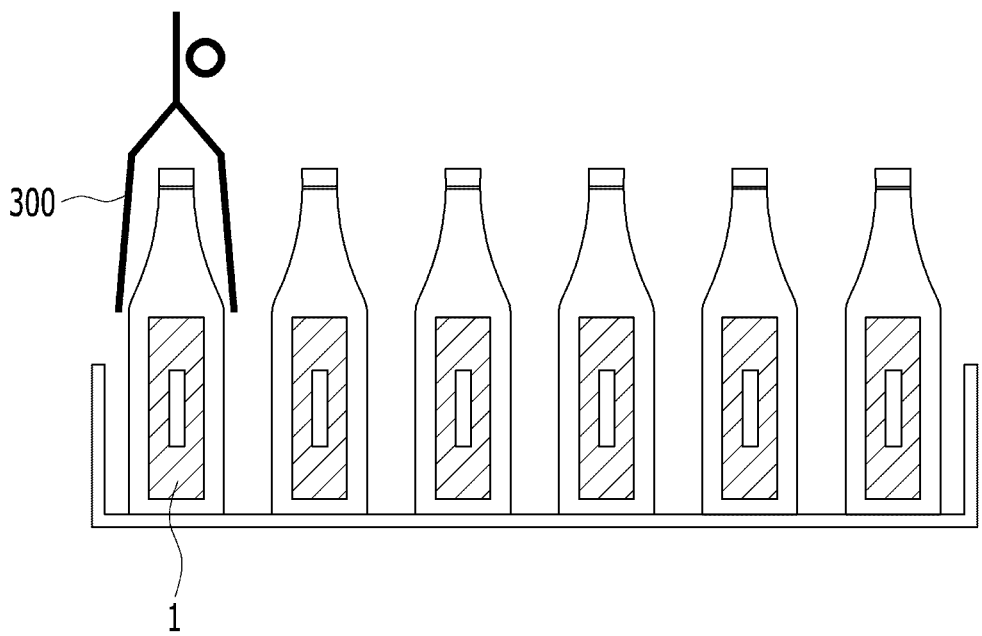

【FIG. 8】
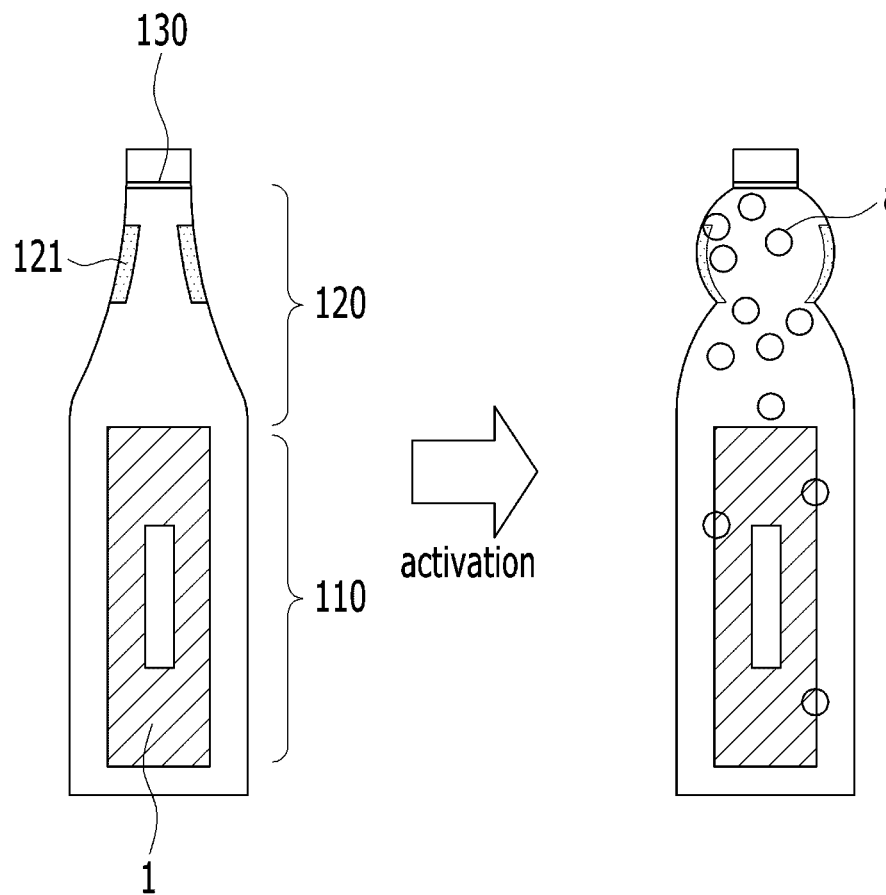

【FIG. 9】
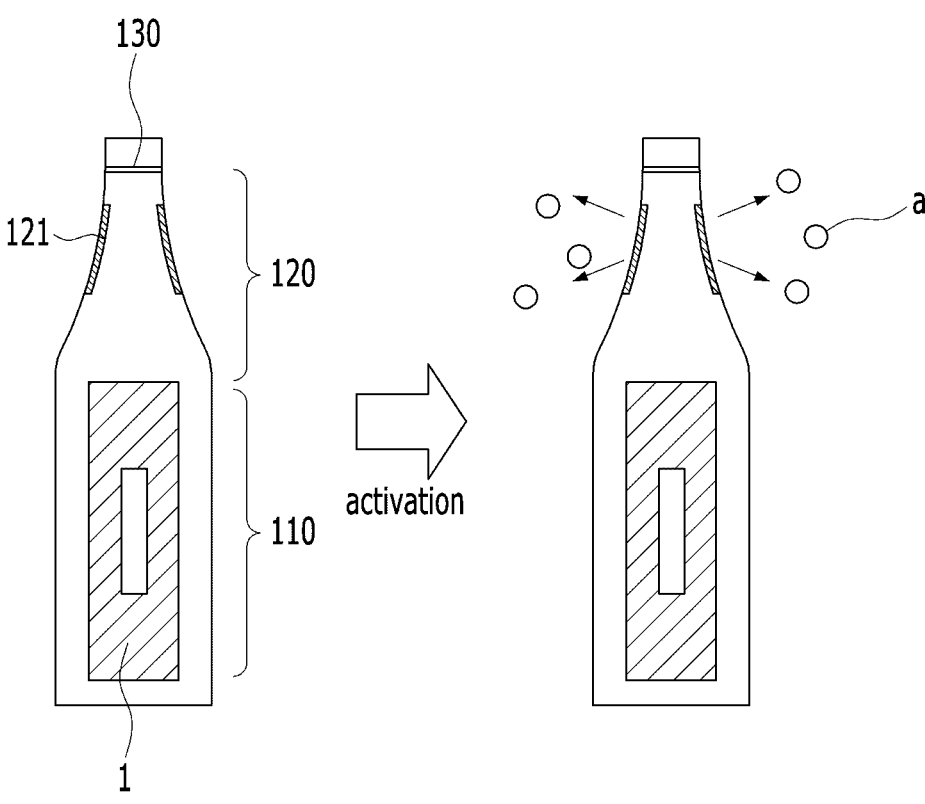

【FIG. 10】
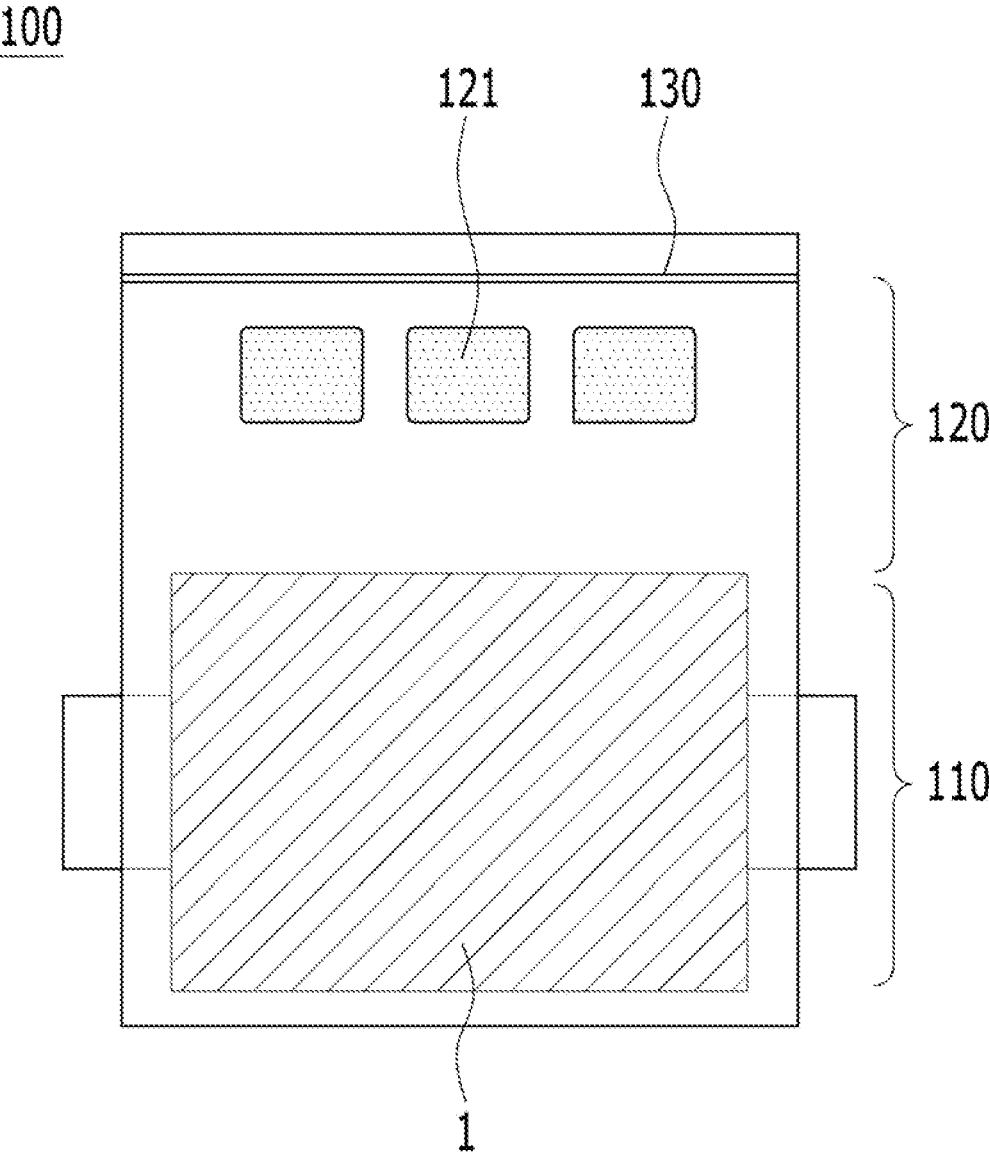

【FIG. 11】
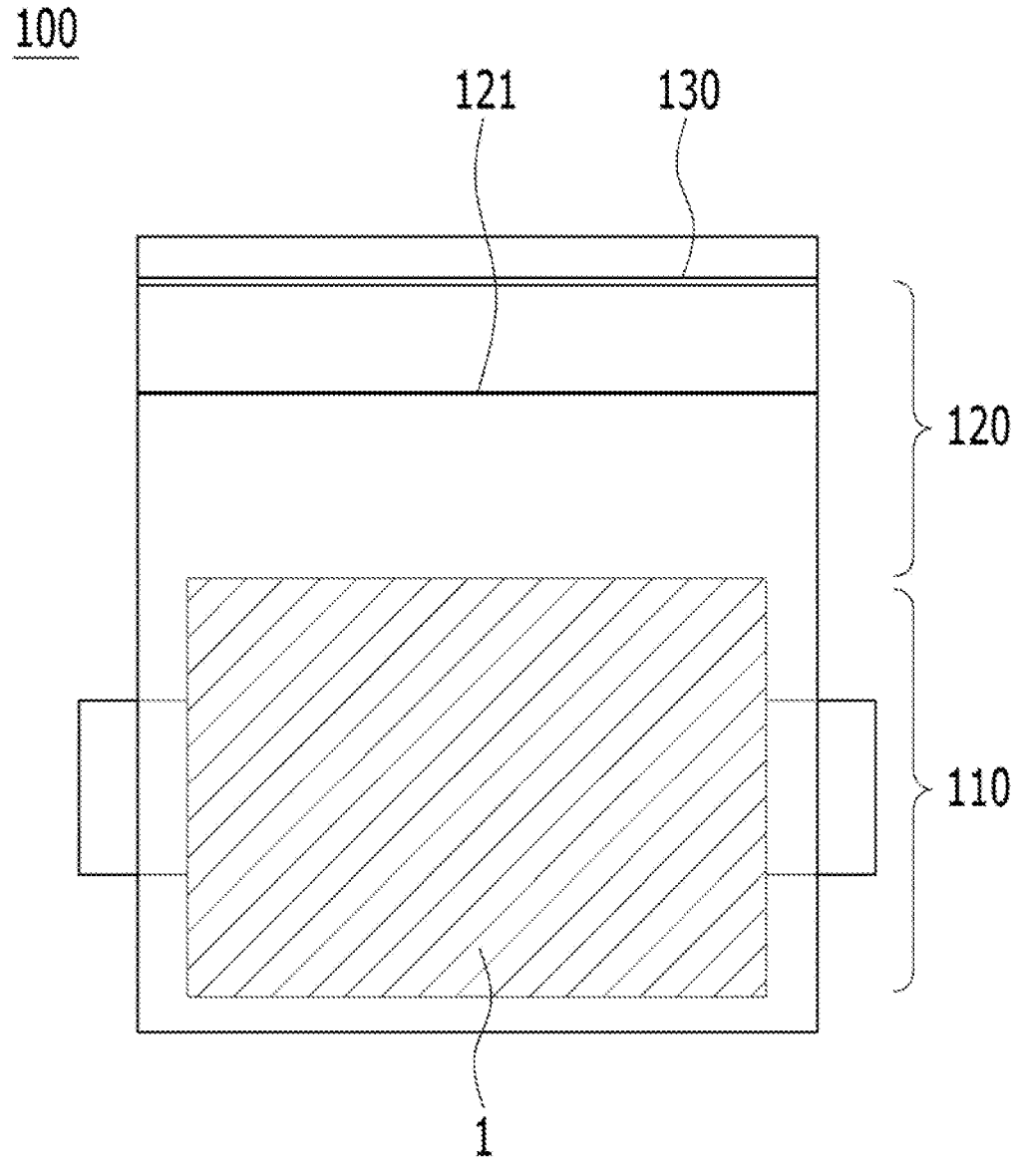

【FIG. 12】
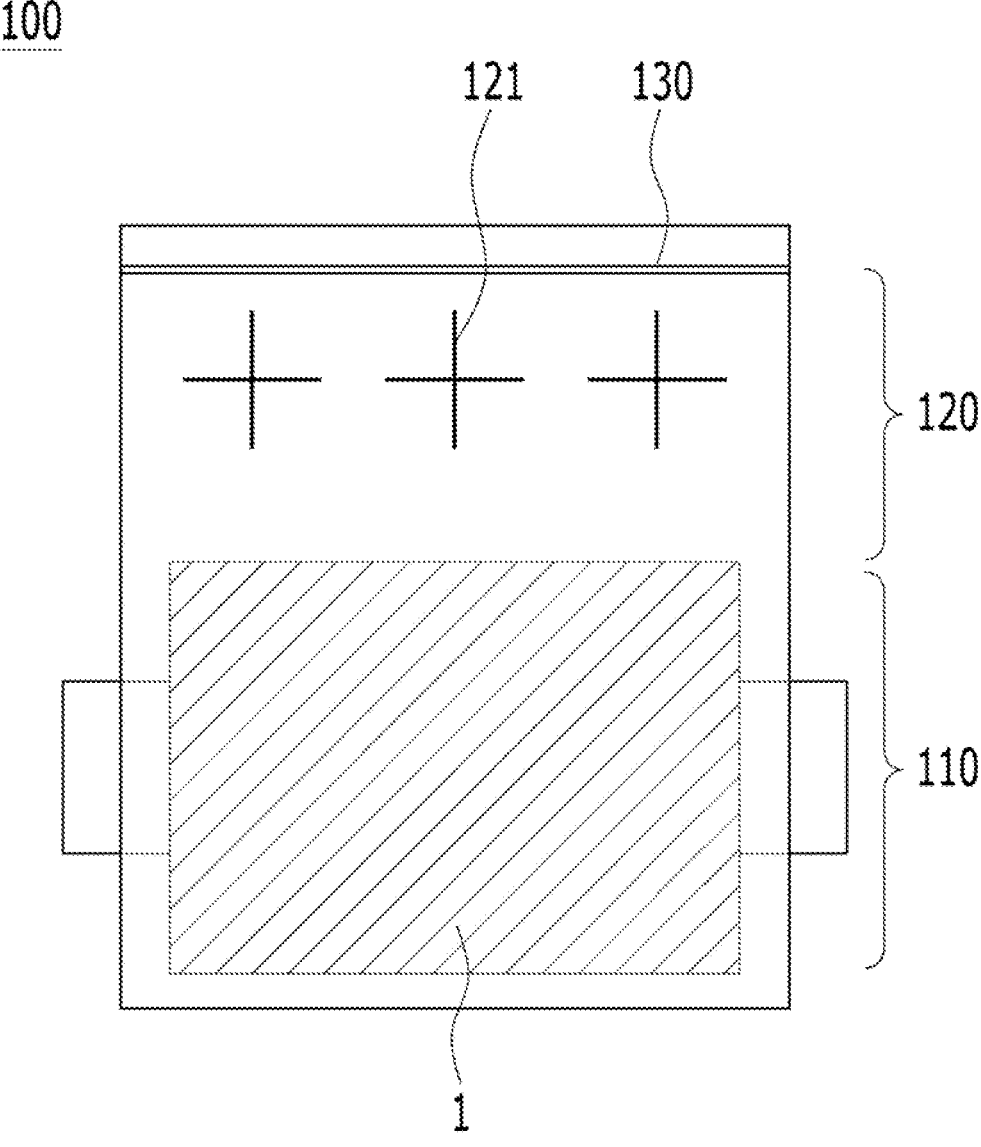

LITHIUM SECONDARY BATTERY CASE FOR SUPPRESSING DEFORMATION OF ELECTRODE ASSEMBLY

TECHNICAL FIELD

This application claims the benefit of priority based on Korean Patent Application No. 10-2019-0132219, filed on Oct. 23, 2019, and the entire contents of the Korean patent application are incorporated herein by reference.

The present invention relates to a battery case for a lithium secondary battery, and to a pouch-type battery case for suppressing deformation of an electrode assembly during an activation process.

BACKGROUND ART

As technology development and demand for mobile devices increase, the demand for secondary batteries as an energy source is rapidly increasing, and among such secondary batteries, many studies have been conducted on lithium secondary batteries having a high energy density and a discharge voltage, and have been commercialized and widely used.

Lithium secondary batteries are largely classified into cylindrical batteries, prismatic batteries, and pouch-type batteries according to their appearance, and are also classified into lithium-ion batteries, lithium-ion polymer batteries, and lithium polymer batteries depending on the type of electrolyte solution.

Due to the recent trend toward the miniaturization of mobile devices, the demand for thinner square-type batteries and pouch-type batteries is increasing, and in particular, there is a high interest in pouch-type batteries that are easy to change in shape, inexpensive to manufacture, and have a small weight.

In general, a pouch-type battery refers to a battery in which an electrode assembly and an electrolyte solution are sealed inside a pouch-type case of a laminate sheet including a resin layer and a metal layer. The electrode assembly accommodated in the battery case has a structure of a jelly-roll type (winding type), a stack type, or a complex type (stack/folding type). Pouch-type secondary batteries are manufactured by forming a receiving portion for mounting the electrode assembly on the laminate sheet, and heat-fusing a separate sheet separated from the sheet in a state that the electrode assembly is attached to the receiving portion, or a sheet extending therefrom.

FIG. 1 is a cross-sectional view of a laminate sheet of a pouch-type secondary battery. Referring to FIG. 1, the laminate sheet 20 has a structure in which an outer layer 21, a barrier layer 22, and an inner layer 23 are sequentially stacked, the outer layer 21 functions to protect the battery from the outside, the barrier layer 22 has a function of preventing the inflow or leakage of foreign substances such as gas and moisture, and a function of improving the strength of the battery case, and the inner layer 23 has a function of enabling heat fusion when sealing the battery case.

FIG. 2 is a front view of a conventional battery cell in which an electrode assembly is accommodated in a pouch of a laminate sheet and a sealing process is completed, and FIG. 3 is a side view of the battery cell of FIG. 2. Referring to these drawings, the battery case 10 includes a receiving portion 11 in which an electrode assembly 1 is accommodated, a sealing unit 13 formed by heat-sealing a laminate sheet, and a gas pocket unit 12 capable of collecting gas generated during the activation process as a free space other than the receiving portion. However, during the activation process, internal gas is generated as shown in FIG. 3. Since it is difficult for gas and moisture, etc. to permeate the barrier layer of the laminate sheet constituting the battery case, and the barrier layer has a small expansion rate, there is a problem that the electrode assembly may be expanded or deformed by the gas collected in the battery case. After the activation process, the gas pocket is punched to discharge the internal gas, but the internal gas generated before the degassing process is performed causes the same problem as described above.

In addition, in order to transfer the battery cells during the activation process, the battery cells should be picked up using a transfer member such as tongs. When the inside of the battery case is swollen by gas, there was a difficulty in the process in picking up the battery cell using tongs 300 as shown in FIG. 4.

Accordingly, there is a need to develop a technology for a battery case that facilitates transport of battery cells for subsequent processes while suppressing deformation of the electrode assembly caused by gas generated during the activation process.

DISCLOSURE

Technical Problem

An object of the present invention is to provide a battery case capable of suppressing a phenomenon in which gas generated during an activation process deforms an electrode assembly before a degassing process.

In addition, an object of the present invention is to provide a battery cell in a form in which the gas generated during the activation process is easily discharged or the gas pocket unit is expanded, so that pickup is easily performed by the transfer member.

Technical Solution

A battery case of the present invention for solving the above problems is a battery case for a lithium secondary battery made of a laminate sheet including an outer layer/barrier layer/inner layer structure, and the battery case includes: a first region that is a region in which gas is discharged or is a region that is relatively easily expanded compared to a second region of the battery case; and the second region is a remaining region excluding the first region, wherein, in the first region, the laminate sheet does not include the barrier layer or the laminate sheet includes the barrier layer in which a slit is formed.

The battery case according to an embodiment of the present invention includes: a receiving portion in which an electrode assembly is accommodated; and a gas pocket portion in which gas generated during an activation process is collected, and the first region is formed in the gas pocket portion.

In an embodiment of the present invention, the barrier layer is aluminum or an aluminum alloy.

In an embodiment of the present invention, the laminate sheet constituting the first region does not contain a barrier layer. At this time, an outer layer of the laminate sheet in the first region may be one or more selected from the group consisting of polyamide, polyester, polyethylene, polypropylene (PP) and cyclic olefin copolymer (COC), or one or more selected from the group consisting of low density polyethylene (LDPE), high density polyethylene (HDPE), polypropylene (PP), biaxially oriented polypropylene (BOPP), and cyclic olefin copolymer (COC).

In an embodiment of the present invention, the laminate sheet constituting the first region includes a barrier layer having a slit formed thereon. At this time, a slit may not be formed at each of the inner layer and the outer layer of the laminate sheet in the first region.

In an embodiment of the present invention, the battery case includes: a receiving portion in which an electrode assembly is accommodated; and a gas pocket portion in which gas generated during an activation process is collected, wherein the first region is formed at a position between the first end of the gas pocket portion and the second end of the gas pocket portion.

In an embodiment of the present invention, the inner layer is polypropylene or polyethylene.

A method for manufacturing a secondary battery according to the present invention includes: a step of inserting an electrode assembly into the battery case; a step of injecting an electrolyte solution into the battery case; and a step of performing an activation process in a state in which the battery case has been sealed or temporary-sealed.

Further, when the battery cases includes a receiving portion in which an electrode assembly is accommodated; and a gas pocket portion in which gas generated during the activation process is collected, the method for manufacturing a secondary battery according to the present invention may further include a step of performing a degassing process of discharging the gas by drilling at least one through hole in the gas pocket portion after the activation process.

Advantageous Effects

In the battery case according to the present invention, a partial region of the laminate sheet constituting the gas pocket unit do not contain a barrier layer that blocks gas and moisture, or as the slit is formed only in the barrier layer, gas inside the battery case is easily discharged through the region, or as the region has relatively excellent expandability compared to other regions, gas generated during the activation process moves to the region. As such, there is an effect of preventing the deformation of the electrode assembly by the internal gas.

In addition, in the battery case according to the present invention, since the gas generated during the activation process is discharged, the degree of swelling of the gas pocket unit by the internal gas is reduced during the activation process, so that it is easy to pick up the battery cells using the transfer member, thereby improving work efficiency in the process.

BRIEF DESCRIPTION OF THE DRAWINGS

FIG. 1 is a cross-sectional view of a general lamination sheet constituting a case of a pouch-type secondary battery.

FIG. 2 is a front view of a battery cell in which an electrode assembly is inserted into a conventional battery case, and an electrolyte solution is injected and sealed.

FIG. 3 is a side view of a battery cell of FIG. 2, showing a state before/after an activation process.

FIG. 4 is a view showing an aspect of picking up the battery cell of FIG. 2.

FIG. 5 is a front view of a battery cell in which an electrode assembly is inserted into a battery case according to an embodiment of the present invention, and an electrolyte solution is injected and sealed.

FIG. 6 is a side view of a battery cell of FIG. 5, showing a state before/after an activation process.

FIG. 7 is a view showing an aspect of picking up the battery cell of FIG. 5.

FIG. 8 is a side view of a battery cell in which an electrode assembly is inserted into a battery case according to another embodiment of the present invention, and an electrolyte solution is injected and sealed, showing a state before/after an activation process.

FIG. 9 is a side view of a battery cell in which an electrode assembly is inserted into a battery case according to further another embodiment of the present invention, and an electrolyte solution is injected and sealed, showing a state before/after an activation process.

FIGS. 10 to 12 are views showing a battery case according to various embodiments of the present invention.

DETAILED DESCRIPTION OF THE PREFERRED EMBODIMENTS

In this application, it should be understood that terms such as "include" or "have" are intended to indicate that there is a feature, number, step, operation, component, part, or a combination thereof described on the specification, and they do not exclude in advance the possibility of the presence or addition of one or more other features or numbers, steps, operations, components, parts or combinations thereof.

Hereinafter, the present invention will be described in detail.

The present invention provides a battery case for a lithium secondary battery made of a laminate sheet including an outer layer/barrier layer/inner layer structure, and the battery case includes: a first region that is a region in which gas is easily discharged or is relatively easily expanded; and a second region that is a remaining region excluding the first region, wherein the laminate sheet constituting the first region does not include a barrier layer or includes a barrier layer in which a slit is formed.

The manufacturing process of a lithium secondary battery includes inserting an electrode assembly into a battery case made of a laminate sheet, injecting an electrolyte solution, and sealing it to perform an activation process. During the activation process, a large amount of gas is generated due to chemical reactions and side reactions between the electrolyte solution and the electrode, and these gases are discharged through a separate process of the degassing process. Therefore, after the activation process is started and before the degassing process is performed, internal gas is filled inside the battery case, which may cause swelling or deformation of the electrode assembly. This is caused as the laminate sheet used as a battery case contains a barrier layer made of a metallic material that is difficult to permeate air or water vapor. Accordingly, the internal gas generated during the activation process is blocked from the outside by the barrier layer and cannot be discharged, and as it is collected inside the battery case, the battery case swells like a balloon.

Accordingly, the present invention was devised to allow the internal gas generated during the activation process to be easily discharged or the internal gas to be easily collected in the gas pocket unit rather than the receiving portion.

The battery case of the present invention is characterized in that the laminate sheet constituting a partial region thereof does not contain a barrier layer unlike the laminate sheet constituting the other regions, or includes a barrier layer in which slits are formed. Conventional laminate sheets have a barrier layer made of metallic material in order to provide the function of preventing the inflow or leakage of foreign substances such as gas and moisture and the function of improving the strength of the battery case. However, due to such a barrier layer, gas generated during the activation process cannot be discharged, and the inside of the battery case is filled. As such, in the battery case of the present invention, the first region, which is a partial region, is composed of a laminate sheet that allows gas to be easily discharged or to be relatively well expanded, and the second region, which is the remaining region excluding the first region, is composed of a conventional laminate sheet.

FIG. 5 is a front view of a battery case 100 according to an embodiment of the present invention. Referring to FIG. 5, the battery case 100 includes a receiving portion 110 in which the electrode assembly 1 of the positive electrode/separator/negative electrode structure is accommodated, a gas pocket unit 120 disposed above the receiving portion to collect gas generated during the activation process, and a sealing unit 130 for sealing the inside of the battery case, and a part of the gas pocket 120 includes a first region 121 that is a region in which gas is easily discharged or is relatively easily expanded. The first region may have a predetermined width and may extend in a direction parallel to the sealing unit 130 of the battery case.

FIG. 10 shows a shape of a first region according to still another embodiment of the present invention. Referring to FIG. 10, the first region 121 having a plurality of rectangular shapes on the gas pocket unit 120 may have a shape arranged in a line in a direction parallel to the sealing unit 130.

It is preferable that the first region 121 is formed between a boundary, in which the receiving portion 110 abuts with one end of the gas pocket unit 120, and the other end of the gas pocket unit. This is because the electrolyte solution may leak if a significant amount of the electrolyte solution is accommodated in the receiving portion in which the electrode assembly is accommodated, and there is no barrier layer in the laminate sheet constituting the receiving portion.

The area occupied by the first region may be appropriately selected according to the air permeability of the inner/outer layer material constituting the laminate sheet and the chemical properties of the electrode assembly and the electrolyte solution. Specifically, the area occupied by the first region may be 5% to 50% based on the area of the gas pocket unit, but is not limited thereto.

The laminate sheet constituting the first region does not contain a barrier layer or includes a barrier layer in which a slit is formed, in order to facilitate gas discharge from the first region or to allow relatively good expansion. A laminate sheet not including a barrier layer has superior gas and moisture permeability compared to a laminate sheet including a barrier layer, so that gas can be easily discharged. In the laminate sheet in which the slit is formed in the barrier layer, even if the barrier layer is included, gas can be discharged through the slit of the barrier layer, so that the gas is easily discharged.

The laminate sheet constituting the first region will be described in detail.

The first embodiment of the laminate sheet constituting the first region does not include a barrier layer, and the material of the outer layer and the inner layer is the same as that of a conventional laminate sheet.

In the first embodiment, since the outer layer of the laminate sheet constituting the first region should have excellent resistance from the external environment in order to protect the battery from the outside, excellent tensile strength and weather resistance compared to the thickness are required. For example, polyamide resin such as nylon, polyester resins such as polyethylene terephthalate (PET), polybutylene terephthalate (PBT), and polyethylene naphthalate (PEN), polyolefin resins such as polyethylene (PE) and polypropylene (PP), polystyrene resin such as polystyrene, polyvinyl chloride resin, polyvinylidene chloride resin, etc. may be used. These materials may be used alone or in combination of two or more.

In the first embodiment, the inner layer of the laminate sheet constituting the first region functions to be thermally fused during temporary sealing or sealing of the battery case. Since the heat fusion can be performed at a temperature of 100° C. to 200° C., the inner layer material is made of a material having a melting point in the temperature range. In addition, since the inner layer serves to ensure insulation, it has low hygroscopicity in order to suppress the intrusion of the electrolyte solution and should not be expanded or eroded by the electrolyte solution. Preferred examples of such an inner layer material include polyethylene, polyethylene acrylic acid, unstretched polypropylene, polyamide, polyamide imide, polyimide, and mixtures or copolymers thereof, but are not limited thereto.

In the first embodiment, the laminate sheet constituting the first region does not include a barrier layer and is composed of only an outer layer and an inner layer, and the material of the outer layer and the inner layer is a polymer material as described above. As such, compared to a conventional laminate sheet, the expandability is improved in the material. Accordingly, the internal gas generated during the activation process naturally moves from the receiving portion that does not expand due to the barrier layer to the first region having good expandability. FIG. 8 shows a state before/after the activation process from the side of the battery cell in which the electrode assembly 1 is inserted into the battery case according to the first embodiment of the present invention, and the electrolyte solution is injected and sealed. Referring to FIG. 8, as the barrier layer is removed, the laminate sheet constituting the first region 121 has relatively excellent expandability compared to the laminate sheet constituting the remaining regions excluding the first region. Accordingly, the gas generated during the activation process tends to move to the first region 121 that is well expanded. Accordingly, most of the internal gas is collected in the first region 121 located on the gas pocket unit 121 to expand the laminate sheet of the first region, and only a small amount of gas remains in the battery cell receiving portion 110. Accordingly, the volume expansion rate of the battery cell receiving portion 110 is reduced, so that it becomes easier for the tongs to pick up the battery cells in a subsequent process.

The second embodiment of the laminate sheet constituting the first region of the present invention does not include a barrier layer, and is composed of an outer layer material having more excellent air permeability compared to the outer layer material of a conventional laminate sheet. FIG. 6 shows a state before and after the activation process from the side of the battery cell in which the electrode assembly 1 is inserted into the battery case according to the second embodiment, and the electrolyte solution is injected and sealed. Referring to FIG. 6, the laminate sheet constituting the first region 121 is the same as the first embodiment in that it does not include a barrier layer, but it is different from the first embodiment in that the outer layer of the laminate sheet constituting the first region 121 is made of a material that allows gas to be well passed and blocks moisture.

Specific examples of outer layer materials that pass gas well but block moisture are one or two or more selected from the group consisting of low density polyethylene (LDPE), high density polyethylene (HDPE), polypropylene (PP), biaxially oriented polypropylene (BOPP), and cyclic olefins copolymer (COC). In the case that the outer layer of the laminate sheet constituting the first region is made of the polymer material, it has excellent moisture blocking performance, compared to general outer layer materials. As such, the moisture blocking performance of the first region can be maintained at a level similar to or slightly lower than that of the laminate sheet including the barrier layer.

Referring to FIG. 6, in the laminate sheet constituting the first region 121, the barrier layer is removed, and gas passes well in the material of the outer layer, so that the internal gas (a) generated during the activation process is well discharged through the first region. Therefore, the battery cell receiving portion 110 is not expanded by the internal gas. Accordingly, as shown in FIG. 7, pickup of the battery cell becomes easy.

A third embodiment of the laminate sheet constituting the first region of the present invention includes a barrier layer in which slits are formed. In this case, it is preferable that the slit is formed only in the barrier layer, and no slit is formed in the outer layer and the inner layer. This is because if the slit is formed in the outer layer and the inner layer, the electrolyte solution may leak during the activation process and negatively affect battery performance. FIG. 9 shows a state before and after the activation process from the side of the battery cell in which the electrode assembly 1 is inserted into the battery case according to the third embodiment, and the electrolyte solution is injected and sealed. Referring to FIG. 9, the laminate sheet constituting the first region 121 does not include a barrier layer, and the outer layer is made of a material having good ventilation, so that gas is easily discharged, and the internal gas (a) generated during the activation process is well discharged through the first region.

FIGS. 11 to 12 illustrate various types of slits according to the third embodiment. The slit of the barrier layer according to the third embodiment may be formed in a straight line shape in the gas pocket 120 as shown in FIG. 11, and may be formed in a cross shape as shown in FIG. 12.

Hereinafter, the laminate sheet constituting the second region in the battery case of the present invention will be described. In the present invention, the second region refers to the remaining areas other than the first region. The laminate sheet constituting the second region is different from the laminate sheet of the first region, and a conventional laminate sheet can be used.

A typical laminate sheet may include an outer layer/barrier layer/inner layer structure. Since the outer layer should have excellent resistance from the external environment in order to protect the battery from the outside, excellent tensile strength and weather resistance are required. For example, polyamide resin such as nylon, polyester resins such as polyethylene terephthalate (PET), polybutylene terephthalate (PBT), and polyethylene naphthalate (PEN), polyolefin resins such as polyethylene (PE) and polypropylene (PP), polystyrene resin such as polystyrene, polyvinyl chloride resin, polyvinylidene chloride resin, etc. may be used. These materials may be used alone or in combination of two or more.

The barrier layer may be made of aluminum or an aluminum alloy to exhibit a function of improving the strength of the battery case in addition to the function of preventing the inflow or leakage of foreign substances such as gas and moisture, and these may be used alone or in combination of two or more.

The inner layer functions to be thermally fused during temporary sealing or sealing of the battery case. Since the heat fusion can be performed at a temperature of 100° C. to 200° C., the inner layer material is made of a material having a melting point in the temperature range. In addition, since the inner layer serves to ensure insulation, it has low hygroscopicity in order to suppress the intrusion of the electrolyte solution and should not be expanded or eroded by the electrolyte solution. Preferred examples of such an inner layer material include polyethylene, polyethylene acrylic acid, unstretched polypropylene, polyamide, polyamide imide, polyimide, and mixtures or copolymers thereof, but are not limited thereto.

In general, polyolefin-based resins such as polypropylene have low adhesive force to metals, so in order to improve adhesive force, the surface of the barrier layer facing the inner layer can be chemically and/or physically processed so that a plurality of irregularities can be formed. Such irregularities can be formed by performing sand blasting or chemical etching, for example, on the surface of the barrier layer, and it is expected to improve adhesive force by securing a wider surface area. The size of the irregularities is not particularly limited, but is preferably 10 to 100 μm so as to provide high bonding force between layers.

The laminate sheet may have a structure further including an adhesive layer between the outer layer and the barrier layer and/or between the barrier layer and the inner layer. The adhesive layer serves to supplement the adhesive force between the barrier layer and the outer layer and the barrier layer and the inner layer.

As the adhesive layer, for example, an adhesive containing a resin such as epoxy-based, phenol-based, melamine-based, polyimide-based, polyester-based, urethane-based, etc. may be used, and a melt-extruded resin layer formed by melt-extrusion-coating (modified) polypropylene or (modified) polyethylene resin may be used. In the laminate sheet constituting the second region, the thickness of the outer layer may be 5 to 40 μm, the thickness of the barrier layer may be 5 to 100 μm, and the thickness of the inner layer may be 10 to 50 μm. If the thicknesses are too thin, it is difficult to expect an improvement in blocking function and strength, whereas if the thickness is too thick, workability decreases and an increase in the thickness of the sheet is caused, which are not preferable.

The present invention provides a method of manufacturing a secondary battery that performs an activation process using the battery case. A method for manufacturing a secondary battery according to the present invention includes: a step of receiving an electrode assembly in the battery case and injecting an electrolyte solution; and a step of performing an activation process in a state in which the battery case has been sealed or temporary-sealed.

The activation process is a concept including an aging process in which an electrolyte solution is sufficiently impregnated for the battery that has been sealed, and an activation process that activates the battery by charging/discharging with a predetermined SOC. During the activation process, in order to prevent trapping of side reaction gas, etc. between the electrode and the separator, it may include a process of pressing at a predetermined pressure simultaneously with charging/discharging or after charging/discharging.

In one specific example, the method of manufacturing a secondary battery according to the present invention may further include performing a degassing process of discharging internal gas by drilling at least one through hole in the gas pocket unit after the activation process.

In the method of manufacturing a secondary battery according to the present invention, as the internal gas generated during the activation process is discharged through the first region or moves to the relatively well-expanded first region, there is an effect of suppressing the phenomenon that the electrode assembly is swelled or deformed by the internal gas. In addition, when the battery cell is picked up with a transfer member such as tongs for the subsequent process, the internal gas is discharged from the battery case, so it has the effect of easy pickup compared to the battery cell in which the battery case was expanded with the internal gas, thereby improving the convenience of the process.

The invention claimed is:

1. A battery case for a lithium secondary battery made of a laminate sheet including an outer layer/barrier layer/inner layer-structure, the battery case comprising:
   a first region that is a region in which gas is discharged or is a region that is relatively easily expanded compared to a second region of the battery case; and
   the second region which is a remaining region excluding the first region,
   wherein, in the first region, the laminate sheet constituting the first region does not include the barrier layer,
   wherein the second region is constituted by the laminate sheet comprising the outer layer, the barrier layer, and the inner layer, and
   wherein, in the first region, the laminate sheet is constituted by the outer layer and the inner layer being directly laminated to each other without the barrier layer disposed therebetween.

2. The battery case of claim 1, further comprising:
   a receiving portion in which an electrode assembly is accommodated; and
   a gas pocket portion in which gas generated during an activation process is collected,
   wherein the first region is formed in the gas pocket portion.

3. The battery case of claim 1, wherein the barrier layer is aluminum or an aluminum alloy.

4. The battery case of claim 1, further comprising:
   a receiving portion in which an electrode assembly is accommodated; and
   a gas pocket portion in which gas generated during an activation process is collected, the gas pocket portion having a first end that meets the receiving portion and a second end spaced from the first end,
   wherein the first region is formed at a position between the first end of the gas pocket portion and the second end of the gas pocket portion.

5. The battery case of claim 1, wherein the outer layer of the laminate sheet in the first region is one or more selected from the group consisting of polyamide, polyester, polyethylene, polypropylene (PP) and cyclic olefin copolymer (COC).

6. The battery case of claim 1, wherein the outer layer of the laminate sheet in the first region is one or more selected from the group consisting of low density polyethylene (LDPE), high density polyethylene (HDPE), polypropylene (PP), biaxially oriented polypropylene (BOPP), and cyclic olefin copolymer (COC).

7. The battery case of claim 1, wherein the inner layer is polypropylene or polyethylene.

8. A method for manufacturing a secondary battery, the method comprising:
   a step of inserting an electrode assembly into the battery case of claim 1;
   a step of injecting an electrolyte solution into the battery case; and
   a step of performing an activation process in a state in which the battery case has been sealed or temporary-sealed.

9. The method of claim 8, wherein the battery case includes:
   a receiving portion in which an electrode assembly is accommodated; and
   a gas pocket portion in which gas generated during the activation process is collected, and
   wherein the method further comprises a step of performing a degassing process of discharging the gas by drilling at least one through hole in the gas pocket portion after the activation process.

10. A battery case for a lithium secondary battery made of a laminate sheet including an outer layer, a barrier layer, and an inner layer, the battery case comprising:
   a first region that is a region in which gas is discharged or is a region that is relatively easily expanded compared to a second region of the battery case; and
   the second region which is a remaining region excluding the first region,
   wherein, in the first region, the laminate sheet comprises a slit formed through only the barrier layer, and
   wherein the inner layer and the outer layer are continuous and un-slitted layers that are respectively laminated on opposite sides of the barrier layer so as to cover the slit.

11. The battery case of claim 10, wherein the slit is provided in a cross-shape.

12. The battery case of claim 4, wherein the first region is provided in plurality between the first end and the second end of the gas pocket portion.

13. The battery case of claim 10, wherein the slit is a slit extending in a longitudinal direction of the battery case.

* * * * *